United States Patent [19]

Shipley

[11] 4,399,056
[45] Aug. 16, 1983

[54] ORGANO ZIRCONIUM-CHROMIUM MIXTURES, CATALYST PREPARED THEREFROM AND POLYMERIZATION OF OLEFINS THEREWITH

[75] Inventor: Randall S. Shipley, Alvin, Tex.

[73] Assignee: The Dow Chemical Company, Midland, Mich.

[21] Appl. No.: 269,221

[22] Filed: Jun. 1, 1981

[51] Int. Cl.$^3$ .............................................. C08F 4/64
[52] U.S. Cl. ............................ 252/431 C; 252/429 B; 252/429 C; 526/114
[58] Field of Search ............ 252/429 B, 429 C, 431 C

[56] References Cited

U.S. PATENT DOCUMENTS

| | | | |
|---|---|---|---|
| 3,752,795 | 8/1973 | Boone | 260/88.2 R |
| 3,847,957 | 11/1974 | Boone | 260/429.5 |
| 3,932,307 | 1/1976 | Setterquist | 252/430 |
| 3,971,767 | 7/1976 | Setterquist | 526/65 |
| 4,011,383 | 3/1977 | Setterquist | 526/154 |
| 4,017,525 | 4/1977 | Setterquist | 252/431 R X |
| 4,031,298 | 6/1977 | Pullukat | 526/113 |
| 4,035,561 | 7/1977 | Hoff et al. | 526/130 |
| 4,053,437 | 11/1977 | Liu et al. | 252/458 |
| 4,204,050 | 5/1980 | Bressler et al. | 252/429 B X |
| 4,224,428 | 9/1980 | Kirch et al. | 252/431 C X |
| 4,226,964 | 10/1980 | Tanaka et al. | 252/429 C X |
| 4,310,648 | 1/1982 | Shipley et al. | 252/429 C X |
| 4,321,159 | 3/1982 | Bressler et al. | 252/429 B |

*Primary Examiner*—Patrick Garvin
*Attorney, Agent, or Firm*—J. G. Carter

[57] ABSTRACT

Ziegler-type catalysts are modified using zirconium compounds such as zirconium octoate and/or chromium compounds such as chromium octoate. These compounds are useful in modifying the catalysts for the polymerization of α-olefins to produce polymers having a high molecular weight and a narrow molecular weight distribution. Synergistic effects are observed when both the chromium and zirconium compounds are present. No special heating or reaction of these compounds is required prior to their use with the catalyst.

9 Claims, No Drawings

ORGANO ZIRCONIUM-CHROMIUM MIXTURES, CATALYST PREPARED THEREFROM AND POLYMERIZATION OF OLEFINS THEREWITH

BACKGROUND OF THE INVENTION

The present invention concerns compositions useful in the preparation of catalysts, the catalysts and the polymerization of olefins employing these catalysts.

Dual transition metal compounds containing both chromium and titanium have been employed in the preparation of catalysts for olefin polymerization in U.S. Pat. Nos. 3,752,795 and 3,847,957. Such dual transition metal compounds are formed by reacting a tetraorganotitanate with chromium oxide.

Typically, catalysts which employ a chromium compound to polymerize ethylene show a sizeable response to both hydrogen and temperature. As a result, most catalyst systems containing chromium must be run at low reaction temperatures (i.e., slurry conditions) to prevent the formation of large amounts of undesirable low molecular weight waxes or high melt index polyethylene.

In a co-pending application, it has been shown that the reaction product of tetravalent hydrocarbyloxy zirconium compounds with oxygen-containing chromium compounds, when added to a Ziegler-type catalyst, is useful in the polymerization of α-olefins to produce polymers having a high molecular weight and a narrow molecular weight distribution. It has now been discovered that hydrocarbon-soluble compounds of zirconium and chromium, and especially combinations of these compounds, can be employed in catalysts to lead to unexpectedly high molecular weights and narrow molecular weight distributions without the necessity of thermally reacting the compounds prior to catalyst addition.

SUMMARY OF THE INVENTION

One aspect of the present invention concerns dual transition metal mixtures or compounds which result from the mixing of an organic soluble chromium compound and a tetravalent zirconium compound.

A second aspect of the present invention concerns using the organic soluble chromium or zirconium compounds independently of each other in catalyst compositions.

Another aspect of the present invention concerns a catalyst for polymerizing α-olefins which comprises (a) the aforementioned mixture, (b) a solid catalyst support, (c) an organometallic activating agent or cocatalyst and (d) a trivalent or tetravalent titanium compound.

Another aspect of the invention is a process for polymerizing α-olefins which comprises conducting the polymerization in the presence of the aforementioned catalyst. Olefins polymerized in such a manner show high polymer molecular weights with, in some cases, very narrow molecular weight distributions.

DESCRIPTION OF THE INVENTION

Suitable zirconium compounds which can be employed in the preparation of the mixtures or compounds of the present invention containing both chromium and zirconium include those represented by the empirical formula

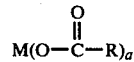

wherein M is Cr or Zr, R is a monovalent hydrocarbyl group having from about 1 to about 12, preferably from about 6 to about 10, carbon atoms and a has a value equal to the valence of the metal M. These compounds, which can be obtained from Shepard Chemical, are hydrocarbon soluble in such solvents as cyclohexane and petroleum spirits.

The term hydrocarbyl as employed herein means alkyl, cycloalkyl, aryl, aralkyl, alkenyl and similar hydrocarbon radicals having from 1 to about 20 carbon atoms, with alkyl having from 1 to about 10 being especially preferred.

The term hydrocarbyloxy as employed herein means alkyloxy, cycloalkyloxy, aryloxy, aralkyloxy, alkenyloxy and similar oxyhydrocarbyl radicals having from 1 to about 20 carbon atoms with alkyloxy having from 1 to about 10 carbon atoms being preferred.

Particularly suitable tetravalent zirconium compounds include, for example, zirconium octoate, zirconium 2-ethylhexanoate, mixtures thereof and the like.

Suitable chromium compounds include, for example, chromium octoate, chromium 2-ethylhexanoate, mixtures thereof and the like.

The molar ratio of chromium compound to zirconium compound is from about 0.05:1 to about 10:1, preferably from about 0.1 to about 7.5:1 and most preferably from about 0.2:1 to about 1:1.

The preferred reaction mixtures or products are those which are hydrocarbon soluble wherein the average value of m in the empirical formula $Cr(O_2CR)_4.mZr(O_2CR)_4$ is less than about 20, preferably less than about 15. In many instances, a synergistic effect takes place by a simple admixture of the compounds. Such is the case, for instance, for chromium 2-ethylhexanoate and zirconium 2-ethylhexanoate.

Suitable inert solid support materials which can be employed herein are magnesium oxide, magnesium chloride, mixtures thereof and the like.

A particularly suitable inert support material is one which is prepared by reacting an organometallic compound, particularly an organomagnesium compound, with a halide source to produce a support having a very high (>100 m²/gm) surface area.

A suitable organomagnesium compound is a hydrocarbon soluble complex illustrated by the empirical formula $MgR''_2.xAlR''_3$ wherein each $R''$ is independently hydrocarbyl or hydrocarbyloxy, and x has a value from about zero to about 10, especially from about 0.015 to about 0.25. As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms being preferred. Hydrocarbyl is preferred over hydrocarbyloxy. In order to obtain maximum catalyst efficiency at polymerization temperatures above 180° C., it is desirable to minimize the amount of aluminum in the complex as well as in the total catalyst. Accordingly, for catalysts having Al:Zr atomic ratios less than 120:1, it is desirable to have a Mg:Al atomic ratio more than 0.3:1, preferably from about 0.5:1 to 10:1.

Preferably, the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein the alkyl has from 1 to 20 carbon atoms. Exemplary suitable magnesium diaryls include diphenylmagnesium, dibenzylmagnesium, and ditolylmagnesium. Suitable organomagnesium compounds include alkyl and aryl magnesium alkoxides and aryloxides and aryl and alkyl magnesium halides with the halogen-free organomagnesium compounds being more desirable. These organomagnesium compounds are available commercially from several sources including Texas Alkyls, Inc., Lithium Corporation of America or Schering Ag Industrie-Chemikalien.

The halide source is suitably a non-metallic halide corresponding to the empirical formula R'X wherein R' is hydrogen or an active monovalent organic radical and X is halogen. Alternatively, the halide source is a metallic halide corresponding to the empirical formula $MR_{y-a}X_a$ wherein M is a member of Groups IIIA or IVA of Mendeleev's Periodic Table of the Elements, R is a monovalent organic radical, usually hydrocarbyl or hydrocarbyloxy; X is halogen; y is a number corresponding to the valence of M and a is a number from 1 to y.

The preferred halide sources are the active non-metallic halides of the formula set forth hereinbefore including hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides as set forth by formula hereinbefore are organometallic halides and metal halides wherein the metal is in Group IIIA or IVA of Mendeleev's Periodic Table of Elements. Preferred metallic halides are tin halides or aluminum halides of the empirical formula $AlR_{3-a}X_a$ wherein each R is independently hydrocarbyl as hereinbefore defined, X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as tin tetrachloride or aluminum trichloride or a combination of tin tetrachloride or aluminum trichloride with an alkyl aluminum halide or a trialkyl aluminum compound may be suitably employed.

A sufficient quantity of the halide source is employed so as to provide a small amount of halide in excess of that required to completely react with the support metal compound in those instances where the support metal compound is reactable therewith such as reacting a dialkyl magnesium compound with a halide source.

It is understood that the organic moieties of the aforementioned organomagnesium, e.g., R", and the organic moieties of the halide source, e.g., R and R', are suitably any other organic radical provided that they do not contain functional groups that poison conventional Ziegler catalysts. Preferably such organic moieties do not contain active hydrogen, i.e., those sufficiently active to react with the Zerewitinoff reagent.

In order to maximize catalyst efficiency, the catalyst is prepared by mixing the components of the catalyst in an inert liquid diluent in any order in which the titanium species is not over-reduced by the magnesium alkyl, that is, so that the magnesium alkyl is converted to $MgCl_2$ before it can over-reduce the active metal.

The foregoing catalytic reaction product is preferably carried out in the presence of an inert diluent or solvent. The concentrations of catalyst components are preferably such that when the essential components of the catalytic reaction product are combined, the resultant slurry is from about 0.005 to about 1.0 molar (moles/liter) with respect to magnesium.

By way of an example of suitable inert organic diluents or solvents can be mentioned liquefied ethane, propane, isobutane, n-butane, n-hexane, the various isomeric hexanes, isooctane, paraffinic mixtures of alkanes having from 6 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about −100° to about 200° C., preferably from about 0° to about 100° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In the catalysts of the present invention, the components are employed in quantities so as to provide the following atomic ratios. The variable M can be Cr, Zr or mixtures of the two elements.

Mg:M atomic ratio is from about 1:1 to about 100:1, preferably from about 2:1 to about 75:1 and most preferably from about 5:1 to about 50:1.

Al:M atomic ratio is from about 1:1 to about 200:1, preferably from about 2:1 to about 100:1 and most preferably from about 5:1 to about 75:1.

M:Ti atomic ratio is from about 0.5:1 to about 20:1, preferably from about 0.75:1 to about 10:1 and most preferably from about 1:1 to about 7.5:1.

And, in cases where Cr and Zr compounds are both used to get a synergistic effect, Cr:Zr atomic ratio is from about 0.05:1 to about 10:1, preferably from about 0.1:1 to about 7.5:1, and most preferably from about 0.15:1 to about 5:1.

Excess X:Al atomic ratio is from about 0.0005:1 to about 5:1, preferably from about 0.002:1 to about 2:1 and most preferably from about 0.01:1 to about 1:1.

Excess X is defined as the excess halide above that which would be theoretically required to convert the magnesium compound to the dihalide.

In those instances where the halide source does not contain a reducing metal such as aluminum or contains an insufficient quantity thereof, then an organometallic compound is added so as to provide the desired quantity of reducing metal.

The organometallic activating agent or cocatalyst is suitably any reducing component commonly employed in Ziegler polymerization. For example, the cocatalyst may be any organometallic reducing compound employed in conventional Ziegler polymerization, preferably an alkyl aluminum compound having at least two alkyl groups per aluminum, e.g., aluminum trialkyls or dialkyl aluminum halides. Examples include aluminum triethyl, aluminum triisobutyl, aluminum triisopropyl, aluminum trimethyl, diethyl aluminum chloride and others wherein the alkyl has from 1 to 12 carbons and halide is preferably chloride or bromide. Preferably, the organometallic reducing compound is present in concentrations sufficient to provide an atomic ratio of reducing metal to transition metal in the range from about 1:1 to about 200:1, preferably from about 2:1 to about 100:1, especially from about 5:1 to about 75:1.

Such activating agents or cocatalysts are generated in situ when an aluminum alkyl halide is employed as the halide source in the preparation of the inert solid support from an organomagnesium compound such as a dihydrocarbyl magnesium compound.

The trivalent titanium compounds employed include those represented by the empirical formula $(RO)_{m-}TiX_{4-m}$ wherein R is a monovalent hydrocarbyl group as previously defined, X is a halogen, preferably chlorine or bromine, and m has a value from zero to 4.

Particularly suitable tetravalent titanium compounds include, for example, $Ti(OiPr)_4$, $Ti(OnBu)_4$, $Ti(OiPr)_2Cl_2$, $TiCl_4$, mixtures thereof and the like.

In addition, titanium trichloride or titanium trichloride complexes may be employed. Advantageously, the trivalent titanium complex is represented by the empirical formula $TiZ_3(L)_x$ wherein Z is halide, and L is an electron donating compound such as water or an organic electron donor, e.g., alcohol, ether, ketone, amine or olefin, and x is a number from 1 to 6. Usually, the organic electron donor has from 1 to 12 carbon atoms and donates an unshared pair of electrons to the complex. In preferred complexes, Z is chloride or bromide, most preferably chloride and L is alcohol, especially an aliphatic alcohol having 2 to 8 carbon atoms and most preferably 3 to 6 carbon atoms such as isopropyl alcohol, n-propyl alcohol, n-butyl alcohol and isobutyl alcohol. While the exact structure of the complex is not known, it is believed to contain 3 valence bonds to the halide ions and 1 to 6, preferably 2 to 4 coordination bonds to the electron donating compound. The titanium halide complex is most advantageously prepared by heating the trivalent titanium halide dispersed in the electron donating compound under nitrogen or similar inert atmosphere. Usually the formation of the complex is visually indicated by a definite change in color. For example, when the dark purple $\alpha$-$TiCl_3$ is heated in anhydrous isopropyl alcohol under nitrogen, complex formation is indicated by the formation of a brilliant blue solution. The complex is normally solid; however, liquid complexes would be suitable. Such catalysts are taught by Birkelbach in U.S. Pat. No. 4,120,820.

In addition to an $\alpha$-$TiCl_3$, the $\Delta$, $\gamma$ and $\beta$ crystalline forms of titanium trichloride are advantageously employed in the preparation of the complex. Also suitable are titanium tribromide, titanium trifluoride and the like. Of the foregoing, the $\Delta$- and $\alpha$- forms of titanium trichloride are preferred. Exemplary electron donating compounds suitably employed include aliphatic alcohols, e.g., isopropyl alcohol, ethanol, n-propyl alcohol, butanol and others having from 1 to 10 carbon atoms; ethers; ketones; aldehydes; amines; olefins and the like having from 1 to 12 carbon atoms and water.

In addition of complexes of trivalent titanium, complexes of tetravalent titanium are also advantageously employed. Such complexes are prepared by the reaction of a dialkyl zinc (diethyl zinc, for example) with a tetrahydrocarbyloxy titanium (tetraisopropyl titanium, for example) to form brilliantly colored and highly active catalyst species. Such catalyst systems are taught in recently allowed patent application Ser. No. 079,773 and U.S. Pat. No. 4,250,286 issued Feb. 10, 1981.

Olefins which are suitably homopolymerized or copolymerized in the practice of this invention are generally the aliphatic $\alpha$-monoolefins or non-conjugated $\alpha$-diolefins having from 2 to about 18 carbon atoms. Illustratively, such $\alpha$-olefins can include ethylene, propylene, butene-1, pentene-1, 4-methylpentene-1, hexene-1, octene-1, dodecene-1, octadecene-1, 1,7-octadiene, 1,4-hexadiene and the like. It is understood that 6O-olefins may be copolymerized with other $\alpha$-olefins and/or with small amounts, e.g., up to about 25 weight percent based on the polymer, of other ethylenically unsaturated monomers such as styrene, $\alpha$-methylstyrene and similar ethylenically unsaturated monomers which do not destroy conventional Ziegler catalysts. Most benefits are realized in the polymerization of aliphatic $\alpha$-monoolefins, particularly ethylene and mixtures of ethylene and up to 50, especially from about 0.1 to about 40, weight percent of at least one other $\alpha$-olefin such as, for example, propylene, butene-1, hexene-1, octene-1, 4-methylpentene-1, 1,7-octadiene or similar $\alpha$-olefin or non-conjugated $\alpha$-diolefin based on total monomer.

In the polymerization process employing the aforementioned catalytic reaction product, polymerization is effected by adding a catalytic amount of the above catalyst composition to a polymerization zone containing at least one $\alpha$-olefin monomer, or vice versa. The polymerization zone is maintained at temperatures in the range from about 0° to about 300° C., preferably at solution polymerization temperatures, e.g., from about 130° to about 250° C., for a residence time of about a few seconds to several days, preferably 15 seconds to 2 hours. It is generally desirable to carry out the polymerization in the absence of moisture and oxygen and a catalytic amount of the catalytic reaction product is typically within the range of about 0.0001 to about 0.1 millimole titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. A carrier employed in the polymerization process is generally an inert organic diluent or solvent or excess monomer. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 to about 1000 l psig, especially from about 100 to about 600 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range from about 1 to about 10 weight percent, most advantageously about 1.2 to about 2 weight percent. To achieve this, when an excess of ethylene is fed into the system, a portion of the ethylene can be vented.

Hydrogen can be employed in the practice of this invention to lower the molecular weight of the resultant polymer. For the purpose of this invention, it is beneficial to employ hydrogen in concentrations ranging from about 0.001 to about 1 mole per mole of monomer. The larger amounts of hydrogen within this range are found to produce lower molecular weight polymers. It is understood that hydrogen can be added with a monomer stream to the polymerization vessel or added separately to the vessel before, during or after addition of the monomer to the polymerization vessel, but during or before the addition of the catalyst. It is also understood that, as a result of this invention, higher amounts of hydrogen are necessary than normally required to obtain a given melt index.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization or, in some instances, the polymerization can be allowed to remain unstirred while the polymerization takes place. In the case of more rapid reactions with more active catalysts, means can be provided for refluxing monomer and solvent, if any of the latter is present, thus removing the heat of reaction. In any event, adequate means should be provided for dissipating the exothermic heat of polymerization. If desired, the monomer can be brought into contact with the catalytic reaction product in the vapor phase, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalyst. The resultant polymer is found to contain insignificant amounts of catalyst residue and to possess a very narrow molecular weight distribution at relatively high molecular weights.

The following examples are given to illustrate the invention, and should not be construed as limiting its scope. All parts are by molar ratio and percentages are by weight unless otherwise indicated.

In the following examples, the melt index values $I_2$ and $I_{10}$ were determined by ASTM D 1238-70 and the density values were determined by ASTM D 1248.

EXAMPLES 1–10 AND COMPARATIVE EXPERIMENTS A AND B

A. Preparation of the Chromium and Zirconium Octoate Solutions used with the Catalyst Samples of chromium and zirconium octoate were received from Shepard Chemical and purified before use. Both samples were distilled to remove traces of residual water and acid, both of which are detrimental to Ziegler catalyst systems. The material was stored over silica gel prior to use. Each compound was diluted to 0.00075 M in Isopar ® E for use with the following catalyst systems.

B. Preparation of the Dialkyl Zinc-Tetrahydrocarbyloxy Titanium Species

A diethyl zinc-tetraisopropyl titanate complex was prepared in the following manner: 0.74 ml of neat (3.36 M) tetraisopropyl titanate was added to a 4-ounce serum bottle. To this was added 0.73 ml of 0.85 M diethyl zinc in Isopar ® E. A rapid change takes place with the color of the mixture changing from clear to yellow to light green in a matter of about 1 minute. The mixture was then diluted to 100 ml total volume to lead to a resulting titanium concentration of 0.025 M with a Zn:Ti molar ratio of 0.25:1.

C. Catalyst Preparation

A catalyst composition was prepared by adding, with stirring, under a nitrogen atmosphere, to a 4-ounce (118.28 cc) serum bottle the following components in the indicated order.

| | |
|---|---|
| 97.80 ml | of Isopar ® E |
| 0.80 ml | of 0.94 M ethyl aluminum dichloride, EADC, in Isopar ® E |
| 0.80 ml | of 0.745 M di-n-hexyl magnesium in Isopar ® E |
| 0.60 ml | of 0.025 M DEZ:Ti(OiPr)$_4$ in Isopar ® E as prepared above |
| 100.00 ml | |

D. Polymerization

A stirred batch reactor containing 2 liters of Isopar ® E was heated to 150° C. The solvent vapor pressure was 21 psig (1.48 kg/cm$^2$). To this was added 19 psig hydrogen and 210 psig of ethylene (except for Comparative Experiment B, where 9 psig of hydrogen and 220 psig of ethylene were added). An amount of 0.00075 M chromium octoate and/or zirconium octoate was added to the reactor, then a quantity of the above catalyst was injected (see table below for amounts). Reactor pressure was held constant at 250 psig with ethylene. The total reaction time was 30 minutes. The polymerization results are given in Table I.

| Example | ml of Catalyst Used | ml of 0.00075 M Cr(octoate)$_3$ Used | ml of 0.00075 M Zr(octoate)$_4$ Used |
|---|---|---|---|
| 1 | 10 | 0 | 2 |
| 2 | 12.5 | 0 | 10 |
| 3 | 17.5 | 0 | 20 |
| 4 | 10 | 2 | 0 |
| 5 | 10 | 4 | 0 |
| 6 | 15 | 10 | 0 |
| A | 10 | 0 | 0 |
| B | 10 | 0 | 0 |
| 7 | 10 | 2 | 2 |
| 8 | 20 | 10 | 2 |
| 9 | 30 | 4 | 20 |
| 10 | 25 | 4 | 20 |

TABLE I

| Example Number | Ratio Cr:Ti | Ratio Zr:Ti | Total Cr + Zr Ti | Efficiency #PE/#Ti | Melt Index (I$_2$) | High Load Melt Index (I$_{10}$) | I$_{10}$/I$_2$ | Expected I$_{10}$/I$_2$ | Density |
|---|---|---|---|---|---|---|---|---|---|
| 1 | — | 1 | 1 | 2.93 × 10$^6$ | 4.74 | 33.75 | 7.12 | 7.72 | 0.9644 |
| 2 | — | 4 | 4 | 1.21 × 10$^6$ | 1.74 | 13.15 | 7.56 | 8.96 | 0.9618 |
| 3 | — | 5.7 | 5.7 | 0.46 × 10$^6$ | 0.896 | 7.46 | 8.33 | 10.43 | 0.9603 |
| 4 | 1 | — | 1 | 2.97 × 10$^6$ | 4.33 | 32.26 | 7.45 | 7.79 | 0.9641 |
| 5 | 2 | — | 2 | 1.97 × 10$^6$ | 3.19 | 25.46 | 7.98 | 8.09 | 0.9638 |
| 6 | 3.33 | — | 3.33 | 0.99 × 10$^6$ | 1.69 | 20.50 | 7.62 | 8.29 | 0.9634 |
| A | — | — | 0 | 4.01 × 10$^6$ | 7.55 | 57.83 | 7.66 | 7.42 | 0.9656 |
| B | — | — | 0 | 2.81 × 10$^6$ | 1.55 | 14.21 | 9.17 | 9.18 | 0.9623 |
| 7 | 1 | 1 | 2 | 2.09 × 10$^6$ | 2.91 | 22.29 | 7.66 | 8.20 | 0.9633 |
| 8 | 2.5 | 0.5 | 3 | 0.49 × 10$^6$ | 0.901 | 7.54 | 8.37 | 10.41 | 0.9598 |
| 9 | 0.67 | 3.33 | 4 | 0.68 × 10$^6$ | 0.654 | 5.99 | 9.16 | 11.28 | 0.9594 |
| 10 | 0.80 | 4.00 | 4.8 | 0.56 × 10$^6$ | CNA** | 0.134 | — | — | 0.9524 |

*Calculated by the empirical formula:

$$I_{10}/I_2 = 6.8881 + 4.1219\left(\frac{1}{x}\right) - .9358\left(\frac{1}{x}\right)^2 + 0.0762\left(\frac{1}{x}\right)^3$$

where x = melt index (I$_2$) and is greater than 0.2.
This formula was derived from a plot of several standard runs for high density polyethylene. For all catalysts, the following ratios are true:
Cr:Ti = 50:1;
Zr:Ti = 40:1
**CNA = could not analyze because melt index was too low.

Examples 1-6 show the unexpected melt index lowering observed when utilizing the chromium or zirconium octoates as compared to Comparative Experiment A. As the level of chromium or zirconium is increased, the melt index is lowered. Also, it is apparent from comparison with the expected I$_{10}$/I$_2$ values of Comparative Experiment B that, as the melt index is lowered by using higher levels of Zr the molecular weight distribution becomes significantly narrower.

Examples 7-10 show another unexpected trend—there appears to be a synergistic effect when the Cr and Zr octoates are combined. Thus, in Examples 8, 9 and 10, even though the total level of metal (Cr and Zr) is less than in Example 3, the melt index is much lower and the catalyst efficiency is much higher. Also, the molecular weight distribution is apparently narrowed considerably as compared with the expected I$_{10}$/I$_2$.

The formation of extremely low melt index polymer allows the production of ultrahigh molecular weight resins, an important market available to polyethylene producers. In addition, the very narrow molecular weight distribution would result in superior properties for resins used in rotational molding applications.

EXAMPLE 11 AND COMPARATIVE EXPERIMENT C

A. Preparation of the Chromium and Zirconium Octoate Mixture used with the Catalyst Samples of chromium octoate and zirconium octoate were distilled as described above. A solution was then prepared in the following manner (all ratios are on a molar basis).

Isopar ® E*
1 part Cr(octoate)$_3$
15 parts Zr(octoate)$_4$

*Sufficient Isopar ® E was added to give a 0.00015 molar concentration of chromium and a 0.00225 molar concentration of zirconium.

B. Catalyst Preparation

A catalyst composition was prepared by adding, with stirring, under a nitrogen atmosphere, to a 4-ounce (118.28 cc) serum bottle, the following components in the following order:

| | |
|---|---|
| 97.49 ml | of Isopar ® E |
| 0.80 ml | of 0.94 M ethyl aluminum dichloride, EADC, in Isopar ® E |
| 0.60 ml | of 0.025 M Ti(OiPr)$_4$ |
| 1.11 ml | of 0.054 M n-butyl-sec-butyl magnesium in Isopar ® E |
| 100.00 ml | |

C. Polymerization

A stirred batch reactor containing 2 liters of Isopar ® E was heated to 150° C. The solvent vapor pressure was 21 psig. To this was added 75 ml of 1-octene, 4 psig of hydrogen and 175 psig of ethylene. For Example 11, 10 ml of the previously prepared chromium octoate-zirconium octoate mixture was injected followed by 25 ml (0.00375 mMoles Ti) of the catalyst. For Comparative Experiment C, only 15 ml (0.00225 mMoles Ti) of the catalyst was injected. Reactor pressure was held constant at 200 psig with ethylene. Total reaction time was 30 minutes. Polymerization results are given in Table II.

TABLE II

| Example Number | Ratio Cr:Ti | Ratio Zr:Ti | Total Cr + Zr Ti | Efficiency #PE/#Ti | Melt Index ($I_2$) | High Load Melt Index ($I_{10}$) | $I_{10}/I_2$ | Density |
|---|---|---|---|---|---|---|---|---|
| 11 | 0.4:1 | 6:1 | 6.4 | $0.78 \times 10^6$ | 0.443 | 4.67 | 10.53 | 0.9381 |
| C | — | — | 0 | $1.64 \times 10^6$ | 2.70 | 19.32 | 7.16 | 0.9354 |

These runs once again show that the chromium and zirconium octoates will produce high molecular weight resins; in this case an ethylene-octene copolymer. The melt index obtained was much lower than obtained for the comparative experiment, and is an unexpected finding for these polymerization temperatures.

I claim:
1. As a composition of matter, the product resulting from mixing (1) at least one zirconium compound represented by the empirical formula

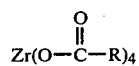

with (2) at least one organic soluble chromium compound represented by the empirical formula

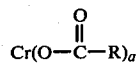

in a mole ratio of component (2) to component (1) of from about 0.05:1 to about 10:1 and wherein each R is independently a hydrocarbon group having from 1 to about 20 carbon atoms and a has a value equal to the valence of Cr.

2. A composition of claim 1 wherein each R is independently an alkyl group having from 2 to about 10 carbon atoms and the mole ratio of component (2) to component (1) is from about 0.10:1 to about 5:1.

3. A composition of claim 2 wherein the mole ratio of component (2) to component (1) is from about 0.2:1 to about 1:1.

4. A composition of claim 3 wherein the chromium compound is chromium octoate and the zirconium compound is zirconium octoate.

5. A catalyst composition which comprises
(A) at least one member of the group consisting of
(1) at least one zirconium compound, represented by the empirical formula

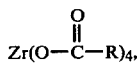

wherein R is a hydrocarbon group having from 1 to about 12 carbon atoms;
(2) at least one hydrocarbon soluble chromium compound represented by the empirical formula

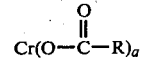

wherein R is a hydrocarbon group having from 1 to about 12 carbon atoms and has a value equal to the valence of Cr; and (3) a mixture of components (1) and (2) in a mole ratio of component (2) to component (1) of from about 0.05:1 to about 10:1;
(B) a solid catalyst support containing magnesium prepared by reacting a magnesium compound with a halide source;
(C) a tetrahydrocarbyloxy titanium or titanium halide compound; and
(D) an organometallic activating agent; wherein (a) the Mg:(Cr+Zr) atomic ratio is from about 1:1 to about 100:1, (b) the Al:(Cr+Zr) atomic ratio is from about 1:1 to about 200:1; (c) the (Cr+Zr):Ti atomic ratio is from about 0.5:1 to about 20:1; (d) the excess X:Al atomic ratio is from about 0.0005:1 to about 5:1; (e) excess X is the excess halide above that which would be theoretically required to convert the magnesium compound to the dihalide; and (f) said catalyst is prepared at a temperature in the range of from about $-100°$ C. to about 200° C.

6. A catalyst of claim 5 wherein component (A-3) is employed as component (A).

7. A catalyst composition of claim 6 wherein
(i) in component (A) each R is independently an alkyl group having from 6 to about 10 carbon atoms;
(ii) the molar ratio of component (A2) to component (A1) is from about 0.1:1 to about 7.5:1;
(iii) said Mg containing support, component (B), is prepared by reacting (a) a compound represented by the empirical formula $MgR''_2 \cdot xAlR''_3$ wherein each R'' is independently a hydrocarbyl or a hydrocarbyloxy group having from 1 to about 20 carbon atoms and x has a value from about zero to about 10 with (b) a halide source selected from non-metallic halides and metallic halides;
(iv) component (C) is a tetrahydrocarbyloxy titanium compound having from 1 to about 10 carbon atoms in each hydrocarbyloxy group;
(v) said organometallic activating agent, component (D), is a trialkyl aluminum or a dialkyl aluminum halide wherein each alkyl group independently has from 1 to about 12 carbon atoms and
(vi) the Mg:(Cr+Zr) atomic ratio is from about 2:1 to about 75:1, the Al:(Cr+Zr) atomic ratio is from about 20:1 to about 100:1, the (Cr+Zr):Ti atomic ratio is from about 0.75:1 to about 10:1 and the excess X:Al atomic ratio is from about 0.002:1 to about 2:1.

8. A catalyst composition of claim 7 wherein
(i) the molar ratio of component (A2) to component (A1) is from about 0.15:1 to about 5:1;

(ii) in component (B) the R groups are independently selected from an alkyl group having from 1 to about 10 carbon atoms and x has a value from about 0.15 to about 2.5;
(iii) component (D) is a trialkyl aluminum compound and
(iv) the Mg:(Cr+Zr) atomic ratio is from about 5:1 to about 50:1, the Al:(Cr+Zr) atomic ratio is from about 5:1 to about 75:1, the (Cr+Zr):Ti atomic ratio is from about 1:1 to about 7.5:1, and the atomic ratio of excess X:Al is from about 0.01:1 to about 1:1.

9. A catalyst composition of claim 8 wherein component (A-1) is zirconium octoate and component (A-2) is chromium octoate.

* * * * *